United States Patent [19]
Stewart, Jr. et al.

[11] Patent Number: 6,030,145
[45] Date of Patent: Feb. 29, 2000

[54] ARTICULATED UNDERWATER CABLE RISER SYSTEM

[75] Inventors: William Ira Stewart, Jr.; Douglas Eugene Tucker, both of Greensboro; Alan David Tysinger, Lexington, all of N.C.

[73] Assignee: Lucent Technologies Inc., Murray Hill, N.J.

[21] Appl. No.: 08/987,820

[22] Filed: Dec. 10, 1997

[51] Int. Cl.[7] ..................................................... F16L 1/20
[52] U.S. Cl. .......................................... 405/172; 405/171
[58] Field of Search .................................... 405/172, 171, 405/169, 167, 158, 162, 166, 183.3, 173

[56] References Cited

U.S. PATENT DOCUMENTS

| | | | |
|---|---|---|---|
| 2,373,439 | 4/1945 | Wheatley | 405/172 |
| 3,813,477 | 5/1974 | Fischer . | |
| 4,183,697 | 1/1980 | Lamy | 405/171 |
| 4,279,543 | 7/1981 | Remery . | |
| 4,909,670 | 3/1990 | Harrison | 405/172 |
| 5,275,510 | 1/1994 | De Baan et al. | 405/171 |
| 5,278,804 | 1/1994 | Halvorsen | 405/171 |
| 5,437,518 | 8/1995 | Maloberti et al. | 405/171 |
| 5,575,590 | 11/1996 | Drost et al. | 405/171 |
| 5,711,639 | 1/1998 | Tessier et al. | 405/171 |

OTHER PUBLICATIONS

Advertising brochure for CRP Marine Limited, Lancashire WN8 8EA England, cover page and pp. 12 and 13 (undated).
Literature re "Bending Restrictions" by CRP Marine, Lancashire WN8 8EA England (undated).
Literature re "Subsea Arch Buoyancy" by CRP Marine, Lancashire WN8 8EA England (undated).
Literature re "Distributed Buoyancy Modules" by CRP Marine, Lancashire WN8 8EA England (undated).
Literature re "Towed Articulated Housing for Geophysical Measurements" NASA Tech Briefs, Sep. 1992, p. 70.

*Primary Examiner*—David Bagnell
*Assistant Examiner*—Frederick L. Lagman
*Attorney, Agent, or Firm*—Killworth, Gottman, Hagan & Schaeff, LLP

[57] ABSTRACT

An articulated underwater cable riser system includes at least one articulated anchor section having a plurality of modular anchor segments and an articulated mid-span buoy having a plurality of modular buoy segments. The anchor segments and buoy segments encircle the cable and are secured adjacent one another in appropriate positions along the cable by cable clamps. The buoy segments and anchor segments are interfaced to the cable clamps by fairings which present smooth outlines for the anchor sections and mid-span buoy between the segments and the clamps to facilitate handling the anchor sections and mid-span buoy using conventional cable laying equipment. The anchor segments and buoy segments can be one-piece or, preferably, assembled by securing segment halves to one another. Bend limiters are coupled to at least some of the anchor segments to prevent an articulated anchor section from exceeding the minimum bend radius for the cable. The bend limiters can be one-piece collars or they can be formed as two pieces which are secured together to form a single bend limiter. The bend limiters are coupled to adjacent pairs of anchor segments by means of studs which extend from the out surfaces of the anchor segments with the studs extending into axially aligned oblong slots in the bend limiters.

28 Claims, 9 Drawing Sheets

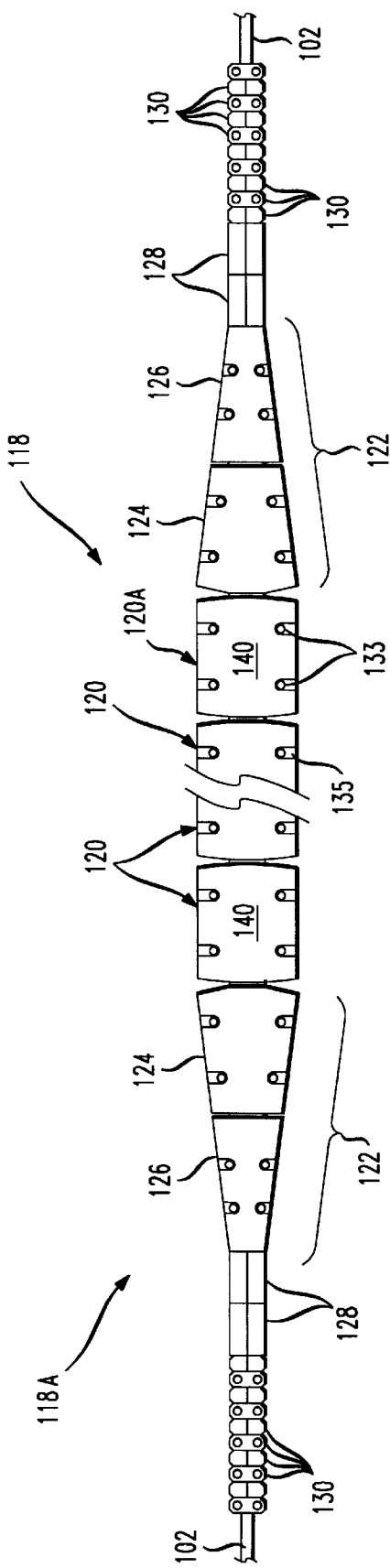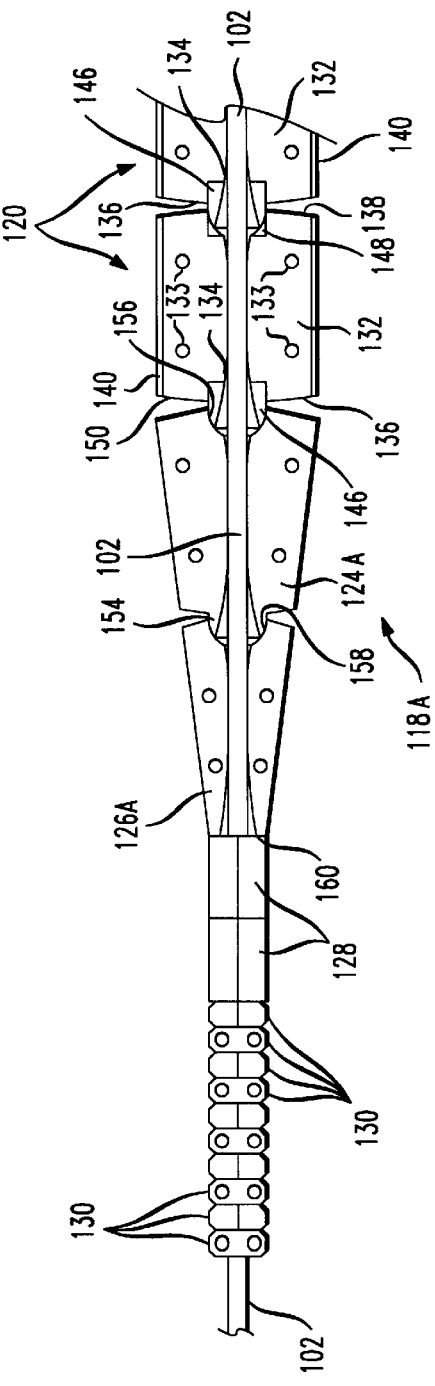
FIG. 2
FIG. 3

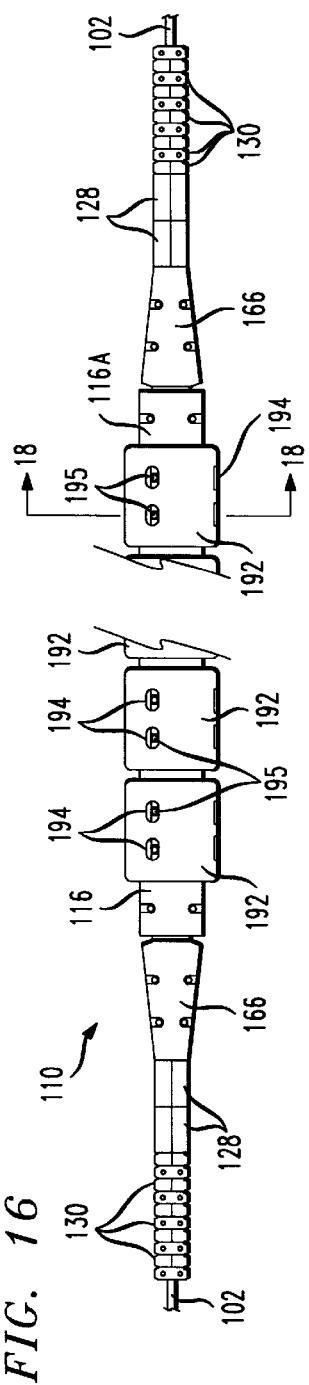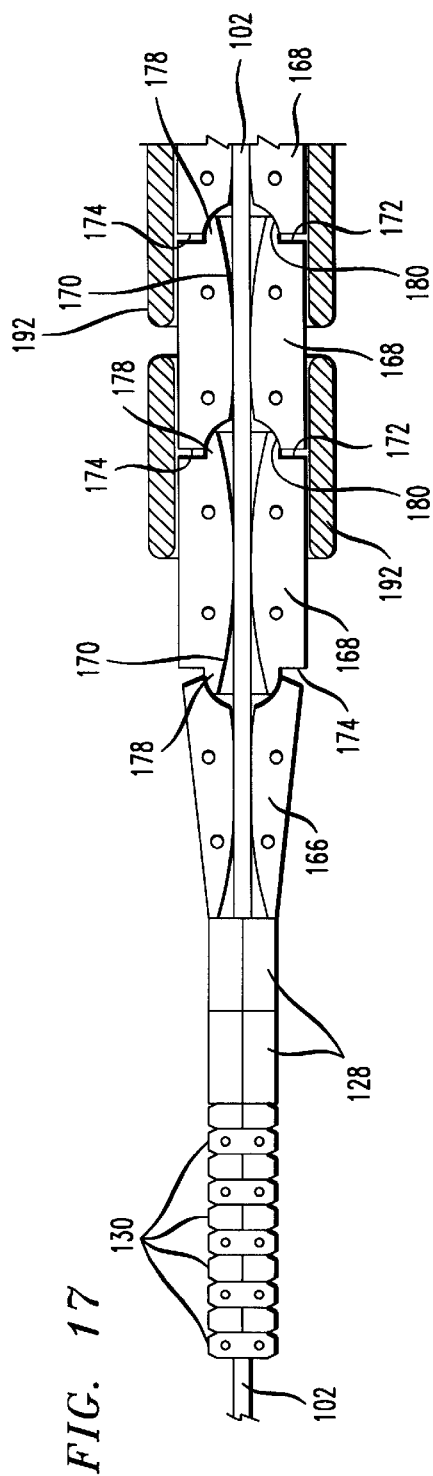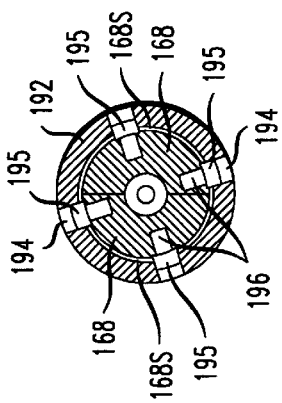

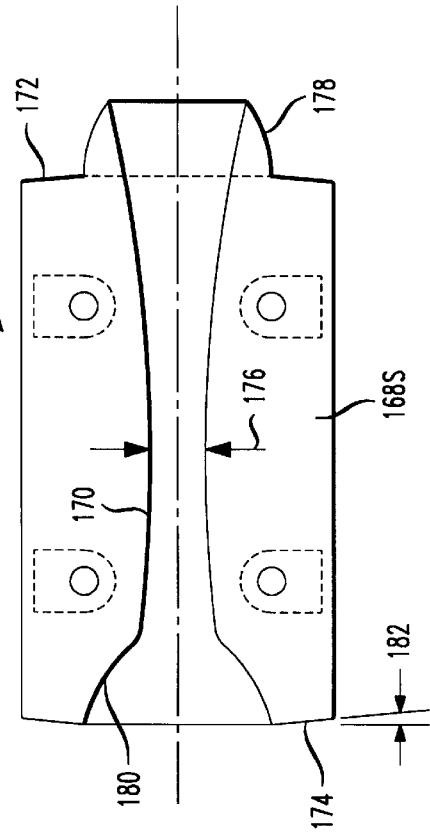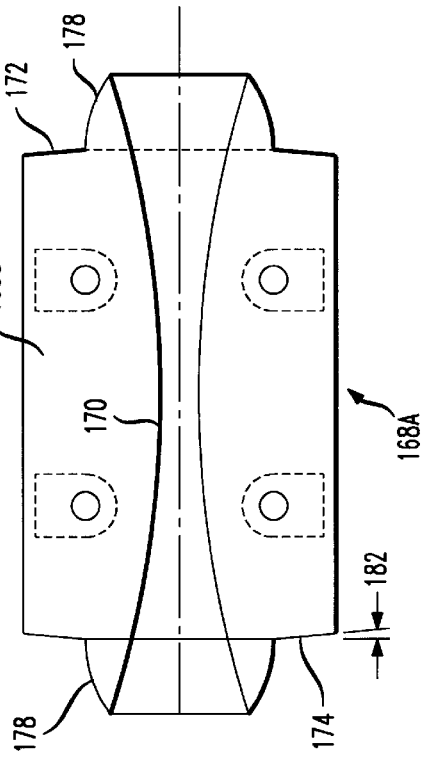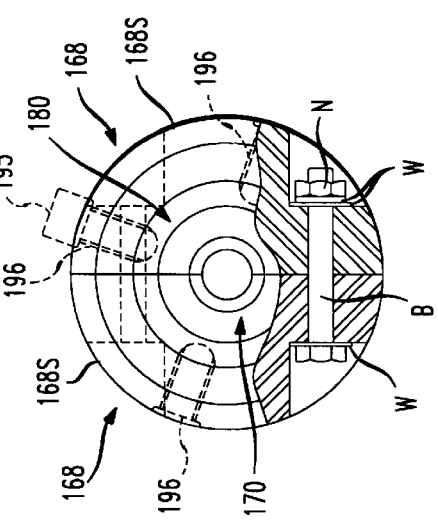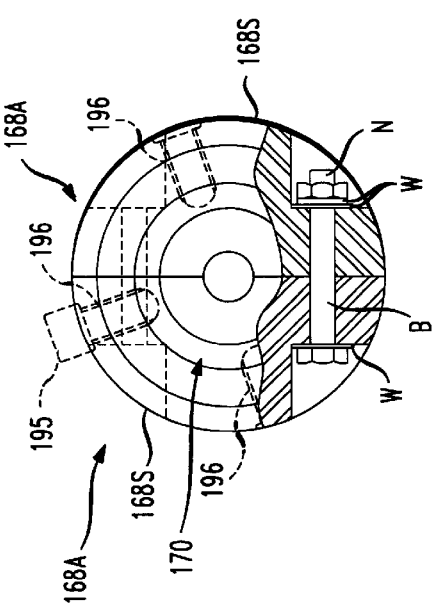

ARTICULATED UNDERWATER CABLE RISER SYSTEM

GOVERNMENT CONTRACT

This invention was made with government support under Contract No. N00039-90-C-0077. The government has certain rights in this invention.

BACKGROUND OF THE INVENTION

The present invention relates in general to underwater communications over cables and, more particularly, to an articulated cable riser system including modular anchors and modular buoys.

Many underwater operations require communications over cables extending between the floor of a body of water, generically referred to herein as a sea, and the surface of the sea. A surface station, such as a ship, moves due to waves, wind and currents. To prevent the cable from being damaged by such motion, the end of the cable which is anchored to the sea floor must be isolated from the surface station.

In existing undersea cable installations, one or more groups of anchors, referred to as "clump" anchors, have been secured to an end or portion of the cable which is to be secured to the sea floor. To provide a slack loop, referred to as a wave, in the cable as it extends from the sea floor to the surface and thereby accommodate motion of the surface station, a group of mid-span buoys, referred to as "clump" buoys, have been secured to the cable some distance above the sea floor to form what is referred to a lazy-S riser. Alternately, distributed buoyancy modules, which are spaced from one another and individually secured to the cable, have been used.

Unfortunately, the clump anchors, clump buoys and distributed buoyancy modules cannot be secured easily to the cable prior to deployment of a cable making their installation time consuming and difficult. Since the clump anchors, clump buoys and distributed buoyancy modules must be secured to the cable as the cable is being installed, they cannot be deployed and recovered using conventional cable laying equipment. Further, installation of a cable using these anchors and buoys usually requires two ships and can result in cable damage due to exceeding the minimum bend radius and/or overtensioning as the result of ship motion in rough seas and/or miscommunication between deck hands and crane operators when two ships are used.

It is, thus, apparent that there is a need for an improved underwater cable riser system which would overcome the problems presented by the current use of clump anchors, clump buoys and distributed buoyancy modules in undersea cable riser installations. Preferably, the improved underwater cable riser system could be rapidly installed on a cable, permit pre-assembly of anchors and buoys to cables to be deployed, and be deployable and recoverable using conventional cable laying equipment for faster installation and recovery.

SUMMARY OF THE INVENTION

This need is met by the invention of the present application wherein an articulated underwater or undersea cable riser system extending between the sea floor and a surface station includes at least one articulated anchor section and an articulated mid-span buoy. Each anchor section has a plurality of modular anchor segments and the mid-span buoy has a plurality of modular buoy segments.

The anchor segments and buoy segments each encircle the cable and are secured adjacent one another in appropriate positions along the cable, depending on the installation, by at least one cable clamp at each end. The buoy segments and anchor segments are interfaced to the cable clamps by fairings which present smooth outlines for the anchor sections and mid-span buoy between the segments and the clamps to facilitate handling the anchor sections and mid-span buoy using conventional cable laying equipment.

The anchor segments and buoy segments each include a cable receiving bore having a minimum dimension near the center of the segments and expanding outwardly as the bores extend toward both ends of the segments. This outwardly expanding formation of the cable receiving bores facilitates articulation of the anchor sections and mid-span buoy and prevents minimum bend radius violations during such articulation. If one-piece segments are used, the cable receiving bore formation also facilitates threading cable through the segments; however, it is currently preferred to form the anchor segments and buoy segments as semi-cylindrical halves which are secured together to form the segments.

The segments and fairings include bearings and bushings, as appropriate, which engage one another when the segments are held together to form the anchor sections and the mid-span buoy. The bushings and bearings also facilitate articulation of the anchor sections and mid-span buoy.

Preferably, bend limiters are coupled to at least some of the anchor segments to prevent an articulated anchor section from exceeding the minimum bend radius for the cable. The bend limiters are illustrated as being solid or one-piece collars; however, they can be formed as two pieces which are secured together to form a single bend limiter. The bend limiters are coupled to adjacent pairs of anchor segments by means of studs which extend from the out surfaces of the anchor segments with the studs extending into axially aligned oblong slots in the bend limiters.

It is, thus, an object of the present invention to provide an improved underwater cable riser system which includes at least one articulated anchor section and an articulated mid-span buoy; to provide an improved underwater cable riser system wherein at least one anchor section has a plurality of modular anchor segments and a mid-span buoy has a plurality of modular buoy segments; and, to provide an improved underwater cable riser system wherein modular anchor segments and modular buoy segments encircle the cable and are secured adjacent one another in appropriate positions along the cable.

Other objects and advantages of the invention will be apparent from the following description, the accompanying drawings and the appended claims.

BRIEF DESCRIPTION OF THE DRAWINGS

FIG. 2 is a side view of a mid-span buoy of the present invention;

FIG. 3 is a partially disassembled side view of an end portion of the mid-span buoy of FIG. 2;

FIG. 16 is a side view of an anchor of the present invention;

FIG. 17 is a partially disassembled and sectioned side view of an end portion of the anchor of FIG. 16;

FIG. 18 is a sectional view of the anchor of FIG. 16 taken along the section line 18—18;

FIG. 19 is a side view of an anchor segment half of the anchor of FIG. 16;

FIG. 20 is a partially sectioned end view of two anchor segment halves assembled to one another to form an anchor segment as shown in FIG. 16;

FIG. 21 is a side view of an anchor transition segment half of the anchor of FIG. 16;

FIG. 22 is a partially sectioned end view of two anchor transition segment halves assembled to one another to form an anchor transition segment as shown in FIG. 16;

DETAILED DESCRIPTION OF THE INVENTION

Figure 1:
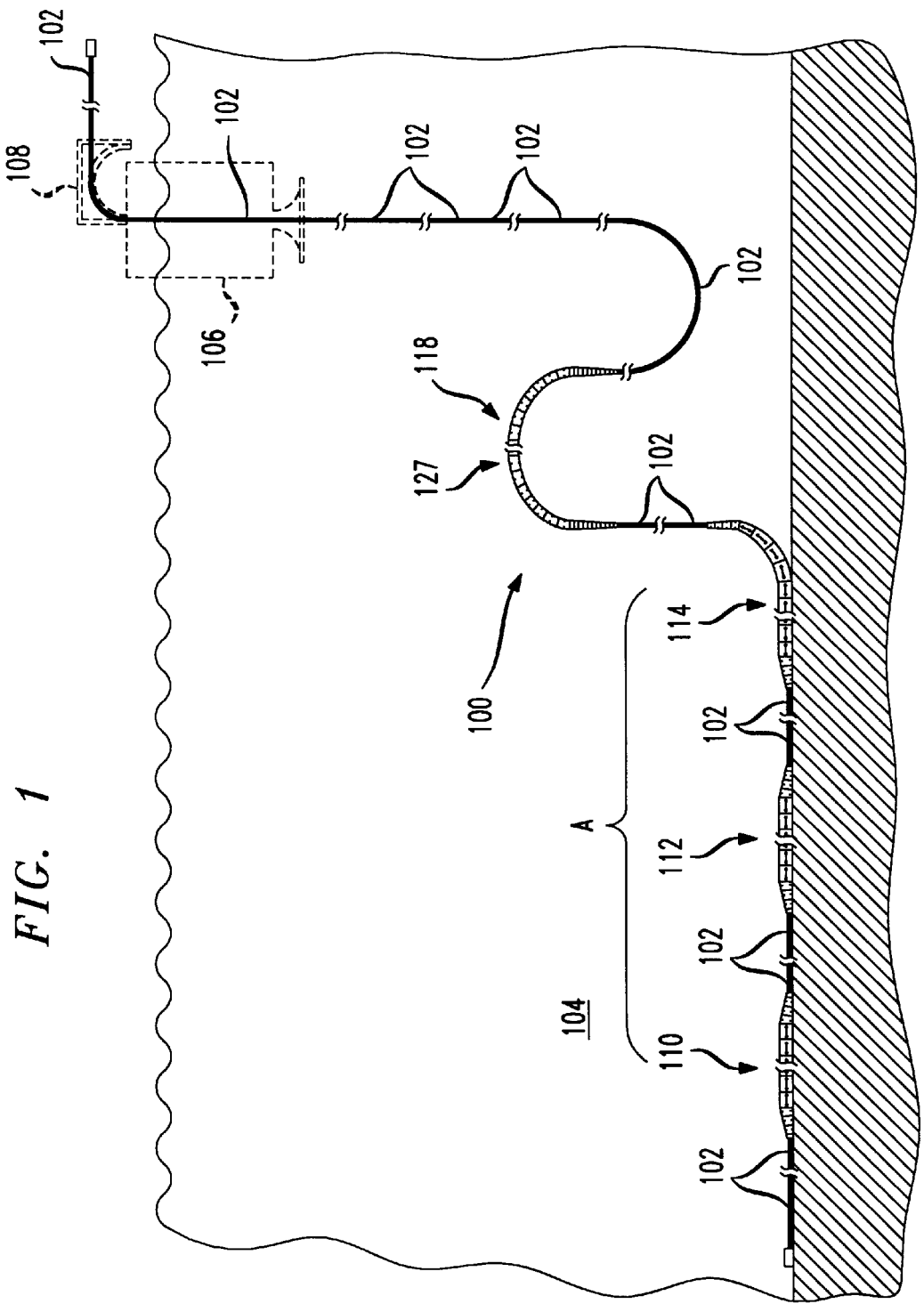
FIG. 1 is a side view of an articulated underwater cable riser system of the present invention.

The invention of the present application will now be described with reference to the drawings wherein FIG. 1 illustrates a representative embodiment of an articulated underwater cable riser system 100 of the invention. In the cable riser system 100 of FIG. 1, the cable 102 is supported at the surface of a body of water 104 by a buoy 106 moored to anchors (not shown) on the sea floor by mooring cables (not shown). The buoy 106 is illustrated as including a pivoting cable support 108 allowing the cable to pivot around the buoy 106 for connection, for example, to a ship. The cable 102 also can be connected directly to a ship, a platform or other surface structure. Since the surface support forms no part of the present invention, the buoy 106 will not be described further herein.

In the articulated underwater cable riser system 100 of FIG. 1, an anchor A comprises first, second and third articulated anchor sections 110, 112, 114 with each of the anchor sections 110, 112, 114 including a plurality of modular anchor segments 116, see FIGS. 16–22, which will be described in detail. The anchor A can comprise any required number of anchor sections with the number of anchor sections depending, for example, on the depth of the site for the installation of a cable riser system. Each of the anchor sections 110, 112, 114 can comprise any reasonable number of anchor segments 116 since the number of anchor segments 116 per anchor section can vary from anchor section to anchor section and from application to application. Having sufficient anchor sections and anchor segments per section ensures that the cable/cable riser system can be deployed from and recovered by a conventional cable laying ship using conventional cable laying equipment without damage to the cable with speeds around 1 knot being employed during deployment of a working embodiment of the cable riser system 100. The modular anchor segments 116 encircle the cable 102 and are secured adjacent to one another at corresponding anchor portions of the cable 102.

An articulated mid-span buoy 118 comprises a plurality of modular buoy segments 120, see FIGS. 2–11, which will be described in detail. The buoy segments 120 encircle a mid-span portion of the cable 102 and are secured adjacent one another in a position on the cable 102 at a mid-span portion of the cable 102. As with the anchor sections, the placement of the mid-span buoy 118 and the number of buoy segments used depends on the site depth and application of the cable riser system 100. As illustrated in FIG. 1, the mid-span buoy 118 of the cable riser system 100 forms a mid-water arch 127 or wave with the riser forming an S-shape lying on its side known as a lazy-S riser.

The mid-span buoy 118 of FIG. 2 shows the modular buoy segments 120, except for the middle segments which are not shown for ease of illustration, extending between fairing portions 122 which each comprise a large fairing 124 and a small fairing 126. The fairing portions 122 and the segments 120 are secured in position on the cable 102 by at least one cable clamp at each end of the mid-span buoy 118 with two cable clamps 128 shown in the illustrated embodiment of FIGS. 2 and 3. For a given application, one, two or more than two cable clamps can be used with the cable clamps 128 being commercially available, for example, from Orcina Cable Protection, Ltd.

To provide strain relief for portions of the cable 102 which extend from either end of the mid-span buoy 118, a plurality of split strain relief elements 130 are secured to the cable 102 at those locations. Strain relief elements 130 are commercially available from REELCRAFT Industries, Inc. and preferable are secured to the cable 102 in an alternating fashion wherein adjacent elements 130 are rotated 900 relative to one another.

Figure 4A:
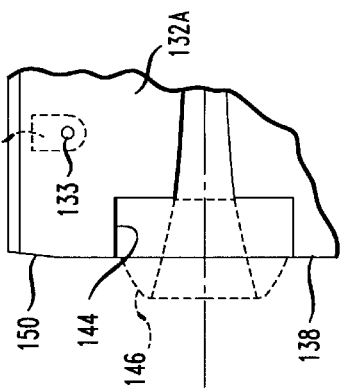
FIG. 4 is a side view of a buoy segment half of the mid-span buoy of FIG. 2.
Figure 4:
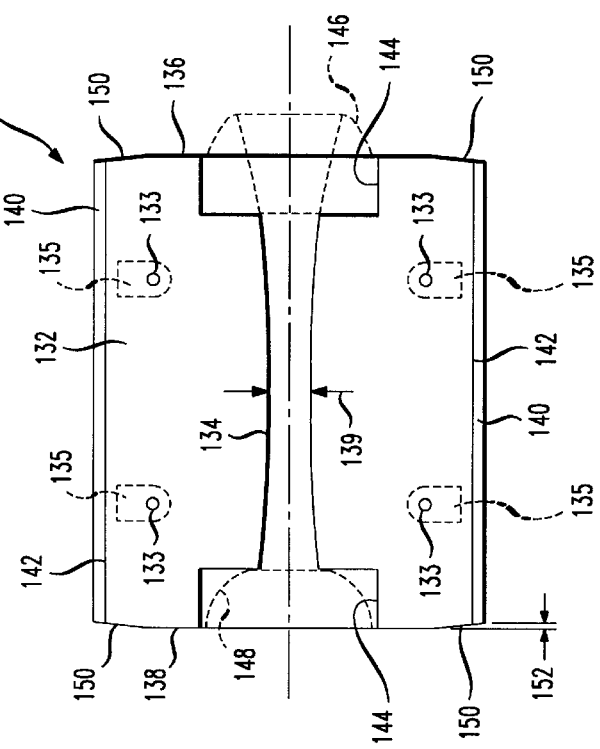
Figure 5:
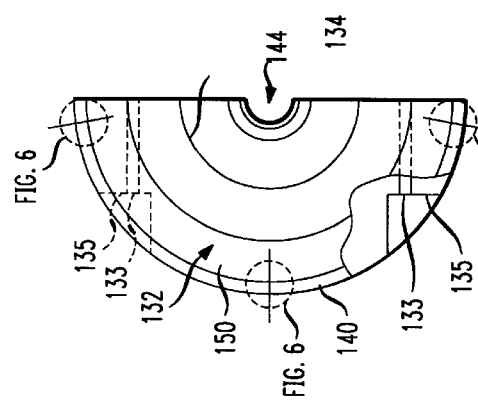
FIG. 5 is an end view of the buoy segment half of FIG. 4.
Figure 6:
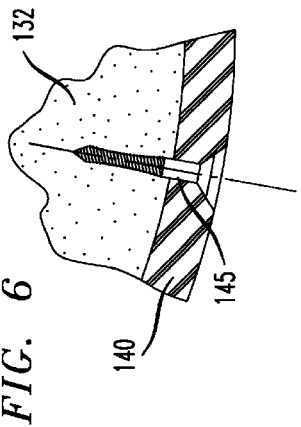
FIG. 6 is a sectioned view of one of a plurality of screws which hold a polymer resin skin to a foam core of the buoy segment half of FIGS. 4 and 5.
Figure 7:
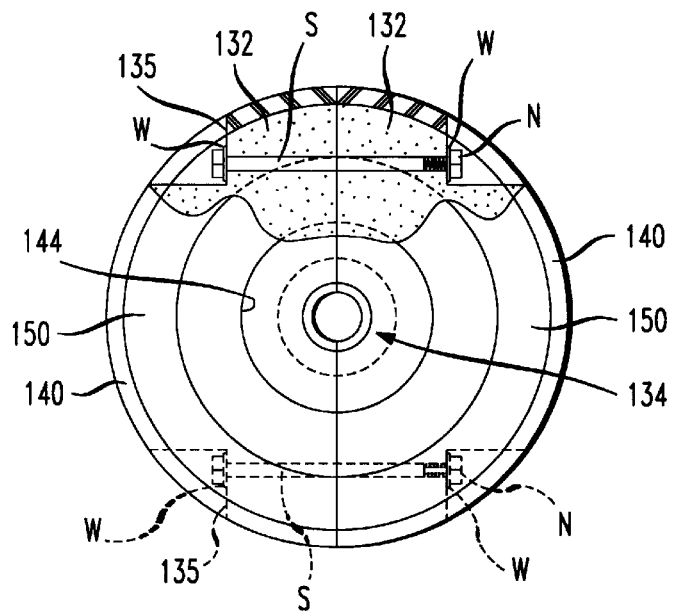
FIG. 7 illustrates two buoy segment halves assembled to one another to form a buoy segment as shown in FIG. 1.
Figure 8:
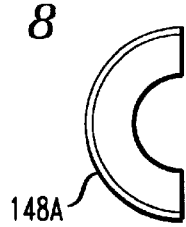
FIGS. 8 and 9 are end and side views, respectively, of a bushing half for insertion into a seat formed in a first end of a body segment of FIG. 1.
Figure 9:
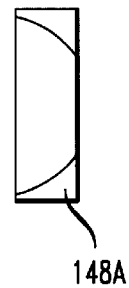
Figure 10:
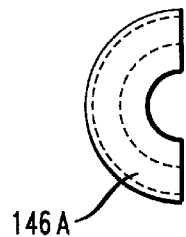
FIGS. 10 and 11 are end and side views, respectively, of a bearing half for insertion into a second end of a body segment of FIG. 1.
Figure 11:
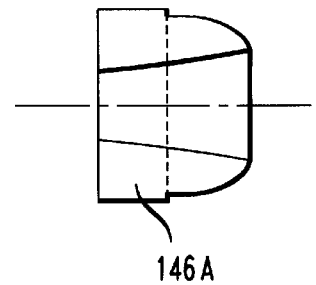
Figure 26:
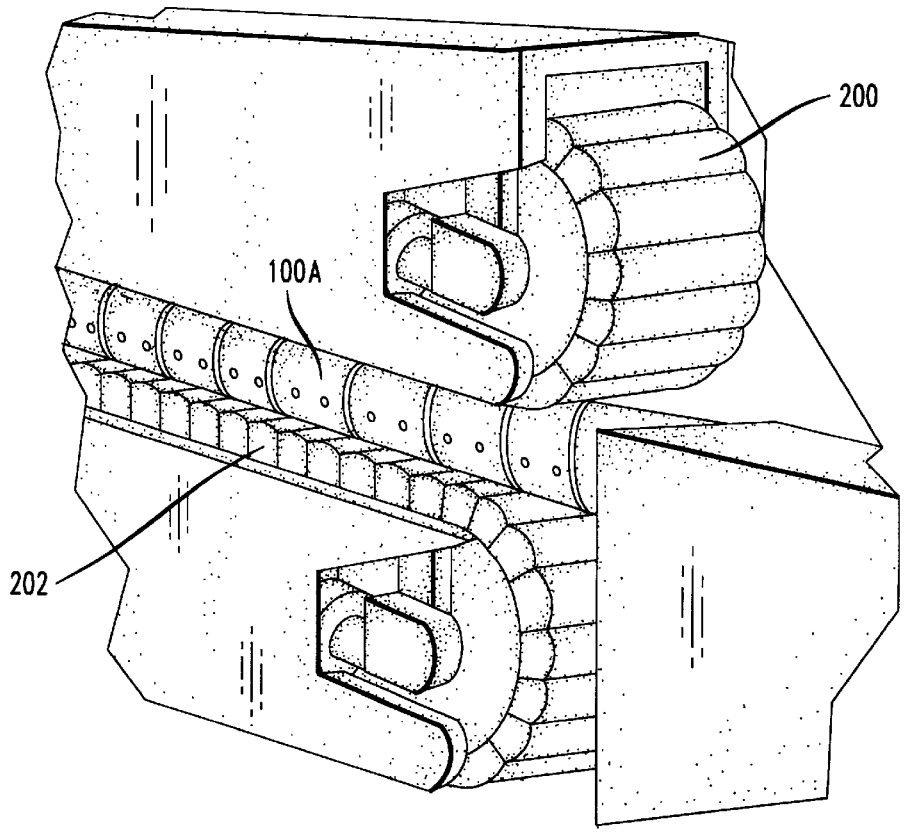
FIG. 26 is a schematic perspective view of a section of the articulated underwater cable riser system of FIG. 1 passing through conventional cable laying equipment.

Each of the mid-span buoy segments 120 comprises a generally cylindrical body of foam material which is split in half, i.e. each segment 120 is made up of two semi-cylindrical body sections 132 which are secured together by screws S, washers W and nuts N, see FIGS. 3, 4 and 7. Body section connecting bores 133 and seats 135 formed through and in the buoy segments 120 receive the screws S and seat the screws S, nuts N and washers W. Each foam body has a cable receiving bore 134 formed axially therethrough from a first end 136 to a second end 138 of the body sections 132. While it is preferred to form the buoy segments 120 by assembling semi-cylindrical body sections such as the body sections 132, for example in place on the cable 102, the use of solid or one-piece buoy segments is also within the scope of the present invention. In a working embodiment of the present invention, the foam material used was a syntactic foam having a density of $\leq 28$ pounds per cubic foot, a hydrostatic service pressure $\geq 3800$ pounds per square inch (PSI) and <1% weight gain after one week at 1000 feet water depth. Such a syntactic foam is commercially available from Syntech Materials, Inc. Other foams can be used in the present invention with the required density and characteristics of the foam depending on buoy deployment depth and resistance to crushing by being handled by a tractor-type linear cable engine used in conventional cable laying equipment, see FIG. 26.

The cable receiving bore 134 has a minimum diameter 139 near the center of the body sections 132 and expands in diameter as the bore 134 extends toward the first and second ends 136, 138 of the body sections 132 of foam material. This formation of the bore 134 facilitates articulation of the mid-span buoy 118 and assembly of the buoy segments 120 to the cable 102 particularly if solid buoy segments are used. The bore 134 can be formed into the body sections 132 by machining or can be formed into the body sections 132 when the foam is cured using removable forms which define the bore 134.

The mid-span buoy segments 120 further comprise an abrasion resistant polymer resin skin 140 over an outer cylindrical sidewall 142 of the body sections 132 of foam material. High density polyethylene (HDPE) is currently preferred for the skin 140; however, other materials can be used in the present invention including, for example, forms of polyester, polyurethane, polyamides and nylon. In addition, seats 144 are formed in the first and second ends 136, 138 of the body sections 132 with the seats 144 being axially aligned with the cable receiving bore 134.

Preferably, the modular buoy segments 120 are formed from sections of HDPE pipe which is cut into sections corresponding to the length of the segments 120. In a working embodiment, the segments 120 were nominally 10.5 inches long and 8.63 inches in diameter for use on a nominally 1 inch outside diameter cable. Syntactic foam is then injected into the pipe sections and cured with the pipe section then being split. Cable bore/seat defining forms are positioned within the pipe sections before the foam is injected and removed after the foam is cured. Alternately, the cable receiving bore 134 and seats 144 are machined into the cured foam after the pipe sections/foam cores are split. The foam adheres to the skin 140 and the skin 140 is also secured to the foam by screws 145 which extend through the skin 140 into the foam. The screws 145 are coated with the same resin which is used to form the syntactic foam, commercially available from Syntech Materials, Inc., to ensure their retention in the body sections 132.

A bearing 146, see FIGS. 3, 4, 10 and 11, is inserted into the seat 144 in the first end 136 of one of the buoy sections 132 and a bushing 148 is inserted into the seat 144 in the second end 138 of one of the buoy sections 132. The bearing 146 and the bushing 148 are also formed as bearing and bushing halves 146A, 148A so that they can be assembled to the cable 102 once inserted into the body sections 132. Of course, as with the body sections 132, the bearing 146 and bushing 148 can be formed as complete bearings and bushings rather than as split halves as illustrated and currently preferred. The bearing 146 and bushing 148 are formed of an abrasion resistant polymer. While high density polyethylene (HDPE) is currently preferred for the bearing 146 and bushing 148, other materials can be used including, for example, forms of polyester, polyurethane, polyamides and nylon. As best shown in FIGS. 2 and 3, each bearing 146 is received within a bushing 148 of another buoy segment 120 or of one of the large fairings 124 to facilitate articulation of the mid-span buoy 118. The buoy segments 120 are formed to define abutting surfaces 150 by chamfers 152 at each end of the buoy segments.

A transition buoy segment 120A, shown at the right end of the mid-span buoy 118 of FIG. 2, is formed by inserting bearings 146 into both ends of a body segment 132A, see FIG. 4A. The body sections 132, 132A can also be formed using a split core (not shown) formed, for example from HDPE, which defines a central cable receiving bore half having a bearing half at one end and a busing half at the other end. The split core is then positioned within a split pipe section and the foam is poured around it and cured in place. For such formation of the transition body segment 132A, the split core has a bearing at both ends.

Figure 12:
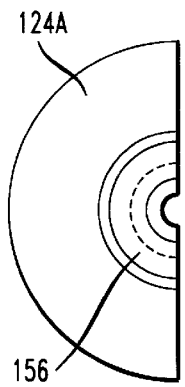
FIGS. 12 and 13 are end and side views, respectively, of a large fairing half of the mid-span buoy of FIG. 1.
Figure 13:
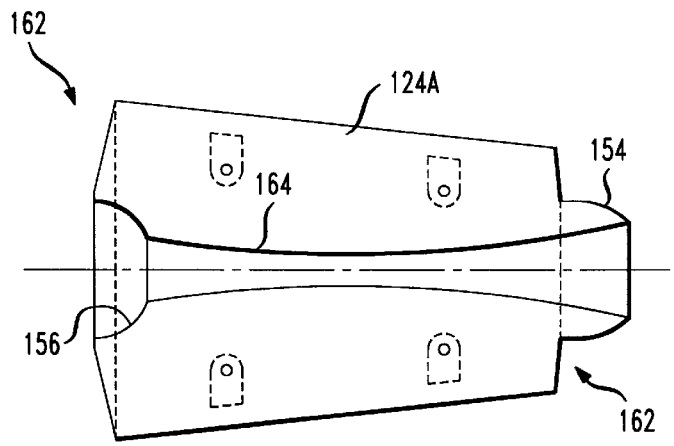

The large fairing 124 is preferably formed as large fairing halves 124A as shown in FIGS. 12, 13, two of which are secured together to form the large fairing 124 in the same manner as that used to form the buoy segments 120. However, the large fairing 124 can be formed as a solid or one-piece body, thus requiring that the fairing 124 be threaded onto the cable 102 but avoiding assembly of the fairing 124. The large fairing 124 defines a bearing 154 at the end adjacent the small fairing 126 and a bushing 156 at the end adjacent the buoy segments 120, and is tapered to provide a substantially smooth transition between the buoy segments and the small fairing 126.

Figure 14:
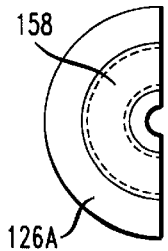
FIGS. 14 and 15 are end and side views, respectively, of a small fairing half of the mid-span buoy of FIG. 1.
Figure 15:
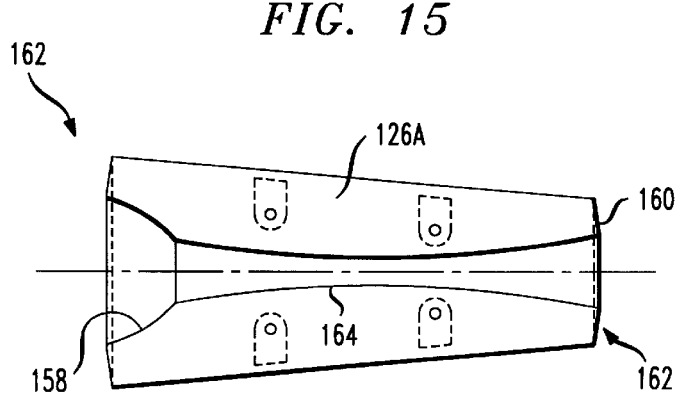

The small fairing 126 is also preferably formed as small fairing halves 126A as shown in FIGS. 14, 15, two of which are secured together to form the small fairing 126 in the same manner as that used to form the buoy segments 120. However, the small fairing 126 can be formed as a solid body, thus requiring that the fairing 126 be threaded onto the cable 102 but avoiding assembly of the fairing 126. The small fairing 126 defines a bushing 158 at the end adjacent the large fairing for receiving the bearing 154 and an abutment face 160 at the end adjacent one of the cable clamps 128.

The large and small fairings 124, 126 are formed of an abrasion resistant polymer. While high density polyethylene (HDPE) is currently preferred for the large and small fairings 124, 126, other materials can be used including, for example, forms of polyester, polyurethane, polyamides and nylon. Chamfers 162 are formed at the ends of the large and small fairings 124, 126 to facilitate articulation of the mid-span buoy 118 and the bores 164 through the fairings 124, 126 have minimum dimensions near the middle of the bores and expand outwardly similar to that of the bores through the body sections 132. This formation of the bores through the fairings 124, 126 further facilitates articulation of the mid-span buoy 118 and assembly of the fairings 124, 126 to the cable 102, particularly if solid fairings are used.

When the mid-span buoy 118 is secured in position to the cable 102, for example by the cable clamps 128, the buoyancy and articulation of the mid-span buoy 118 leads to the formation of the mid-water arch 127 or wave thus forming the lazy-S riser of FIG. 1.

Since the anchor sections 110, 112, 114 are substantially the same, except for possible variations in the number of anchor segments 116, cable clamps 128, strain relief elements 130, and associated bend limiters, only the anchor section 110 will be described in detail. The articulated anchor section 110 of FIG. 16 shows the anchor segments 116, except for the middle segments which are not shown for ease of illustration, extending between anchor fairings 166. The anchor segments 116 and anchor fairings 166 are secured in position on the cable 102 by at least one cable clamp at each end of the anchor section 110 with two cable clamps 128 shown in the illustrated embodiment of FIGS. 16 and 17. For a given application, one, two or more than two cable clamps can be used with the cable clamps 128 being commercially available, for example, from Orcina Cable Protection, Ltd.

To provide strain relief for portions of the cable 102 which extend from either end of the anchor section 110, a plurality of split strain relief elements 130 are secured to the cable 102 at those locations. Strain relief elements 130 are commercially available from REELCRAFT Industries, Inc. and preferably are secured to the cable 102 in an alternating fashion wherein adjacent elements 130 are rotated 90° relative to one another.

Each of the anchor segments 116 comprises a generally cylindrical body formed, for example, of zinc coated steel which is split in half, i.e. each segment 116 is made up of two semi-cylindrical anchor body sections 168 which are secured together by bolts B, nuts N and washers W substantially the same as the above described mid-span buoy segments 120, see FIGS. 17–20. The bolts B and nuts N can be secured to one another using commercially available thread locking compounds.

Each of the anchor body sections 168 has a cable receiving bore 170 formed axially therethrough from a first end 172 to a second end 174 of the anchor body sections 168. While it is preferred to form the anchor segments 116 by assembling semi-cylindrical body sections such as the anchor body sections 168, for example in place on the cable 102, the use of solid or one-piece anchor segments is also within the scope of the present invention. When solid anchor segments are used, they must be threaded onto the cable 102; however, assembly of the anchor segments is avoided.

The materials used for the anchor body sections 168 of a working embodiment of the present invention was 1081, ASTM A29 steel which was coated with Fe/ZN 25, Type I, 0.001 inch thick. The anchor body segments 116 for that embodiment were nominally 10.5 inches long and nominally 6.00 inches in diameter before being coated for use on a nominally 1 inch outside diameter cable. The disclosed materials are appropriate for a submerged life of at least 1.0 year. Obviously, the materials selected for a given riser system will vary and depend on the given application and required life for the system. Longer life materials should be considered for any application intended to be in place for longer periods of time, particularly for the fasteners used to assembly the riser system. For example, materials such as monel, titanium, 17-4PH stainless steel and 316 stainless steel may be used.

The cable receiving bore 170 has a minimum diameter 176 near the center of the anchor body sections 168 and expands in diameter as the bore 170 extends toward the first and second ends 172, 174 of the anchor body sections 168. An axially aligned bearing 178 is formed at the first end 172 of the anchor body sections 168 and an axially aligned bushing 180 is formed at the second end 174 of the anchor body sections 168, with the bearing 178 and bushing 180 being sized so that the bearing 178 can be received within the bushing 180.

While a plurality of anchor segments 116, i.e. pairs of anchor body sections 168, are used for the articulated anchor section 110, a transition anchor segment 116A made up of two anchor body sections 168A, see FIGS. 21, 22, is used to couple the leftmost anchor segment 116 to the left fairing 166 as illustrated in FIGS. 16 and 17. The transition anchor body section 168A is substantially the same as the anchor body sections 168 except that bearings 178 are formed at both ends of the transition anchor body section 168A. All the anchor body sections 168, 168A include chamfers 182 at each end of the anchor body sections.

Figure 23:
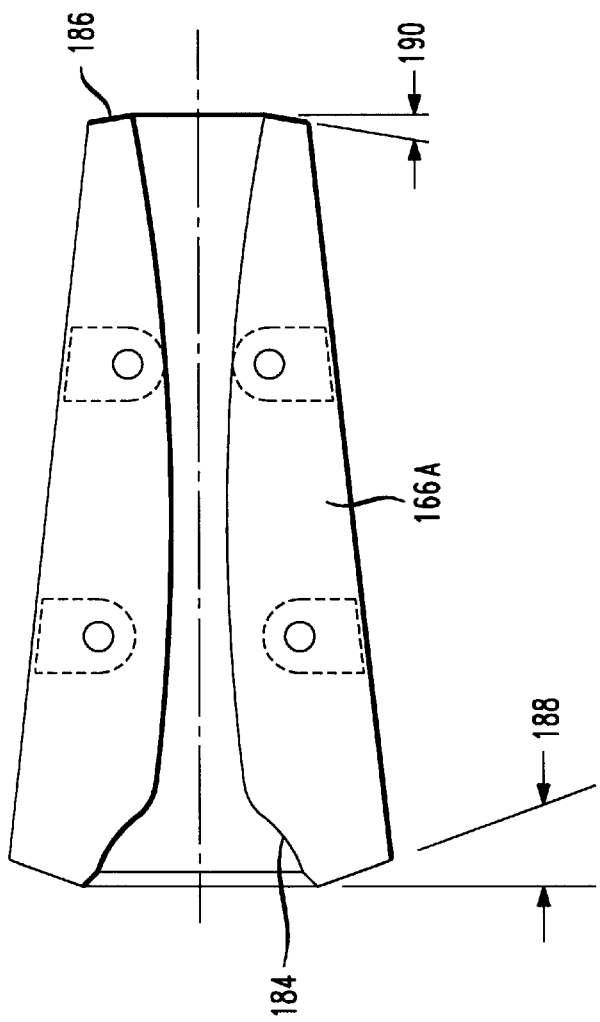
FIG. 23 is a side view of an anchor fairing half of the anchor of FIG. 16.
Figure 24:
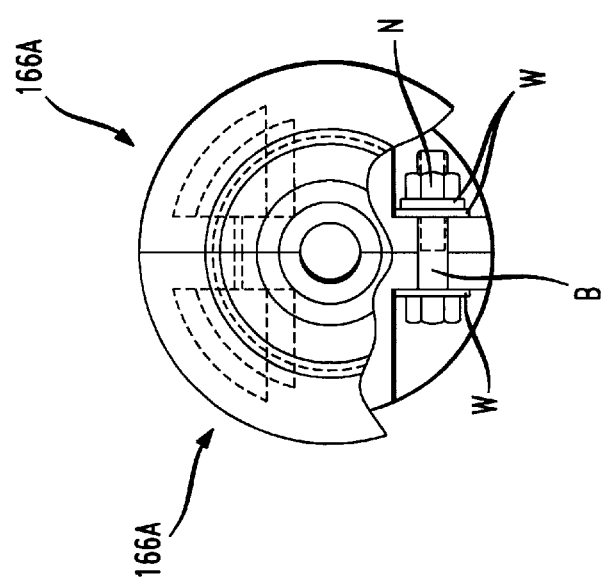
FIG. 24 is a partially sectioned end view of two anchor fairing halves assembled to one another to form an anchor fairing as shown in FIG. 16.

The fairing 166 is preferably formed as fairing halves 166A as shown in FIGS. 23, 24, two of which are secured together to form the fairing 166 in the same manner as that used to form the buoy segments 120 and the anchor segments 116. The fairing 166 can be formed as a solid body, thus requiring that the fairing 166 be threaded onto the cable 102 but avoiding assembly of the fairing 166. The fairing 166 defines a bushing 184 at a first end adjacent one of the anchor body sections 168 or the transition anchor body section 168A for receiving one of the bearings 178 of the anchor body section 168 or of the transition anchor body section 168A. At the second end of the fairing 166 adjacent one of the cable clamps 128, an abutment face 186 is formed with the fairing 166 being tapered to provide a substantially smooth transition between the transition anchor body segment 168A and the one of the cable clamps 128. The fairing 166 preferably is made of zinc coated steel or other appropriate material as described above for the anchor segments 168, 168A, and includes a chamfer 188 at the first end and a chamfer 190 at the second end of the fairing 166.

Bend limiters are coupled to at least some, preferably all, of the anchor segments 168, 168A to prevent the articulated anchor section 110 from exceeding the minimum bend radius for the cable 102. The bend limiters are formed as collars 192, see FIGS. 16–18 and 25, which include four pairs of axially aligned slots 194 with the slots 194 being axially oblong. The anchor segments 168, 168A include studs which extend from their outer surfaces 168S. In the illustrated embodiment, the studs are formed by screws 195, preferably socket head cap screws, which are secured into threaded bores 196. The screws 195 are threaded into the threaded bores 196 and preferably secured therein using commercially available thread locking compounds.

Figure 25:
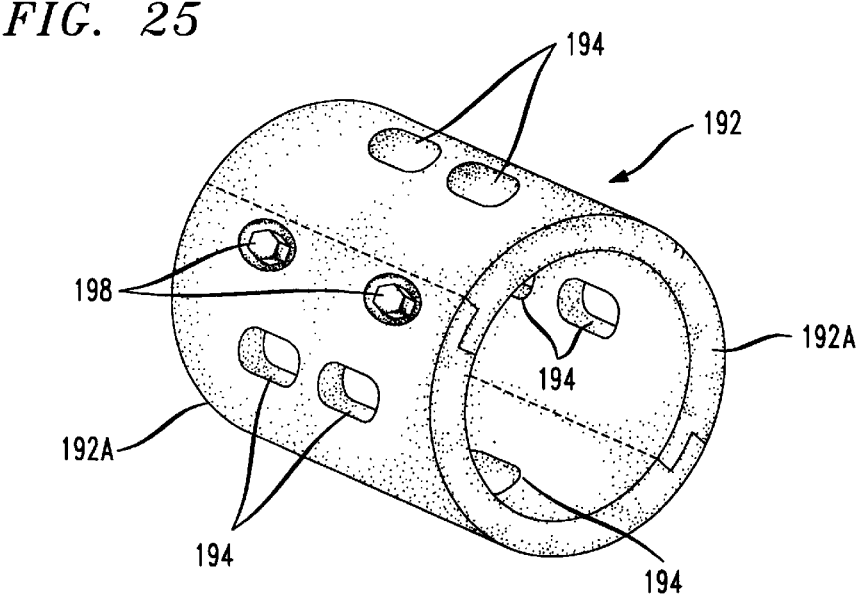
FIG. 25 is a perspective view of an anchor bend limiter.

Each of the bend limiters or collars 192 extends between and is coupled to a pair of anchor segments 168, 168A by having the studs of the pair of anchor segments 168, 168A received within the slots 194 of the collar 192. As the articulated anchor section 110 is bent, the studs engage the ends of the slots 194 to limit the bending of the anchor section 110. As illustrated in FIG. 25, the collar 192 currently is preferred to be made as a solid element of zinc coated steel; however, the collar 192 can be made in two sections or halves 192A which can be secured together using bolts 198 which are received into threaded bores (not shown). If a two-part collar is used, it is preferred to secure the bolts 198 in the threaded bores using a commercially available thread locking compound.

One of the advantages of the present invention is that the articulated underwater cable riser system 100 can be deployed and recovered using conventional cable laying equipment. While it should be apparent that the cable riser system 100 can be passed through such equipment, it is illustrated in schematic perspective view in FIG. 26 wherein a section 100A of the articulated underwater cable riser system 100 is shown passing between upper an lower tracks 200, 202 of a tractor-type linear cable engine of such cable laying equipment. The articulation of the anchor sections 110, 112, 114 and the mid-span buoy 118 permit arching of the cable riser system 100 as it passes over a cable drum and an overboarding chute or sheave of a cable laying ship under the control of the tractor-type linear cable engine. Such arching is illustrated by the arched portions of the anchor section 114 and the mid-span buoy 118 in FIG. 1.

Having thus described the invention of the present application in detail and by reference to preferred embodiments thereof, it will be apparent that modifications and variations are possible without departing from the scope of the invention defined in the appended claims.

What is claimed is:

1. An articulated underwater riser system for a cable, said system comprising:
   an anchor comprising at least a first plurality of modular anchor segments encircling a first anchor portion of a cable, said first plurality of modular anchor segments being secured adjacent one another on said cable at said first anchor portion of said cable;
   a mid-span buoy comprising a plurality of modular buoy segments encircling a mid-span portion of said cable, said plurality of modular buoy segments being secured adjacent one another in position on said cable at said mid-span portion of said cable; and
   a plurality of anchor bend limiters coupled to at least some of said anchor segments of said at least first plurality of modular anchor segments.

2. An articulated underwater riser system for a cable as claimed in claim 1 wherein said anchor and said mid-span buoy are shaped so that said articulated underwater riser system, when assembled on said cable, can be deployed and recovered using conventional cable laying equipment.

3. An articulated underwater riser system for a cable as claimed in claim 1 wherein said plurality of modular buoy segments articulate said mid-span buoy to form a mid-water arch between a floor of a body of water and a surface of said body of water between which said cable extends.

4. An articulated underwater riser system for a cable as claimed in claim 1 further comprising a second plurality of modular anchor segments encircling a second anchor portion of said cable, said second plurality of modular anchor segments being secured on said cable at said second anchor portion of said cable.

5. An articulated underwater riser system for a cable as claimed in claim 4 further comprising a third plurality of modular anchor segments encircling a third anchor portion of said cable, said third plurality of modular anchor segments being secured on said cable at said third anchor portion of said cable.

6. An articulated underwater riser system for a cable as claimed in claim 1 wherein said plurality of anchor bend limiters each comprise a collar including slots, said anchor segments to which said bend limiters are coupled including studs extending from outer surfaces of said anchor segments and into said studs, each of said bend limiters extending between a pair of said anchor anchor body segments and receiving studs from anchor segments within said slots.

7. An articulated underwater riser system for a cable as claimed in claim 6 wherein each of said anchor segments of said at least first plurality of modular anchor segments comprises two halves which are secured together.

8. An articulated underwater riser system for a cable as claimed in claim 7 wherein said studs comprise heads of bolts screwed into said anchor segments.

9. An articulated underwater riser system for a cable as claimed in claim 7 wherein each of said bend limiters comprises two halves which are secured together to form said collar.

10. An articulated underwater riser system for a cable, said system comprising:
    an anchor comprising at least a first plurality of modular anchor segments encircling a first anchor portion of a cable, said first plurality of modular anchor segments being secured adjacent one another on said cable at said first anchor portion of said cable;
    a mid-span buoy comprising a plurality of modular buoy segments encircling a mid-span portion of said cable, said plurality of modular buoy segments being secured adjacent one another in position on said cable at said mid-span portion of said cable;
    at least one cable clamp at each end of said anchor and at each end of said mid-span buoy for securing said anchor and said mid-span buoy on said cable; and
    a plurality of strain relief elements secured to said cable adjacent each of said at least one cable clamp at each end of said anchor and at each end of said mid-span buoy.

11. An articulated underwater riser system for a cable as claimed in claim 10 wherein said mid-span buoy further comprises at least one fairing interposed between said plurality of modular buoy segments and said at least one clamp at each end of said mid-span buoy.

12. An articulated underwater riser system for a cable as claimed in claim 11 wherein said at least one fairing comprises a small fairing adjacent said at least one clamp and a large fairing interposed between said small fairing and said plurality of modular buoy segments.

13. An articulated underwater riser system for a cable as claimed in claim 12 wherein each of said mid-span buoy segments comprises a generally cylindrical body of foam material having a cable receiving bore formed axially therethrough from a first end of said body to a second end of said body.

14. An articulated underwater riser system for a cable as claimed in claim 13 wherein each of said mid-span buoy segments further comprises an abrasion resistant polymer resin skin over an outer cylindrical sidewall of said body of foam material.

15. An articulated underwater riser system for a cable as claimed in claim 14 wherein said cable receiving bore has a minimum diameter near the center of said body and expands in diameter as said bore extends toward said first and second ends of said body of foam material.

16. An articulated underwater riser system for a cable as claimed in claim 15 wherein seats are formed in said first and second ends, said seats being axially aligned with said cable receiving bore.

17. An articulated underwater riser system for a cable as claimed in claim 16 wherein a bearing is inserted into said seat in said first end of said body and a bushing is inserted into said seat in said second end of said body, said bushing being shaped to receive said bearing when a first end of one of said mid-span buoy segments is placed adjacent to a second end of another one of said mid-span segments.

18. An articulated underwater riser system for a cable as claimed in claim 17 wherein a large end of said large fairing defines a bushing and a small end of said large fairing defines a bearing.

19. An articulated underwater riser system for a cable as claimed in claim 18 wherein a large end of said small fairing defines a bushing.

20. An articulated underwater riser system for a cable as claimed in claim 19 wherein said small fairing and said large fairing are made of an abrasion resistant polymer resin.

21. An articulated underwater riser system for a cable as claimed in claim 20 wherein each of said mid-span buoy segments comprises two semi-cylindrical sections which are sandwiched around said cable with said cable being positioned within said cable receiving bore and secured to one another.

22. An articulated underwater riser system for a cable as claimed in claim 10 wherein said anchor further comprises fairings interposed between said at least first plurality of modular anchor segments and said at least one clamp at each end of said anchor.

23. An articulated underwater riser system for a cable as claimed in claim 22 wherein each of said anchor segments comprises a generally cylindrical body having a cable receiving bore formed axially therethrough from a first end of said body to a second end of said body.

24. An articulated underwater riser system for a cable as claimed in claim 22 wherein said cable receiving bore has a minimum diameter near the center of said body and expands in diameter as said bore extends toward said first and second ends of said body.

25. An articulated underwater riser system for a cable as claimed in claim 24 wherein each of said anchor segments further comprises a bearing extending from said first end of said body, said cable receiving bore extending through said bearing.

26. An articulated underwater riser system for a cable as claimed in claim 25 wherein one of said anchor segments comprises an anchor transitional segment and said anchor transitional segment further comprises a bearing extending from said second end thereof.

27. An articulated underwater riser system for a cable as claimed in claim 26 wherein said cable receiving bores of remaining ones of said anchor segments, excluding said anchor transitional segment, expand to define bushings in said second ends of said remaining anchor segments, bearings of said anchor segments being sized to be received by said bushings of said anchor segments.

28. An articulated underwater riser system for a cable as claimed in claim 27 wherein a large end of each of said fairings defines a bushing, bushings of said fairings receiving bearings of said anchor transitional segment and an end one of said remaining anchor segments opposite said transitional segment.

* * * * *

UNITED STATES PATENT AND TRADEMARK OFFICE
CERTIFICATE OF CORRECTION

PATENT NO.   : 6,030,145
DATED        : February 29, 2000
INVENTOR(S)  : William Ira Stewart, Jr. et al.

It is certified that error appears in the above-identified patent and that said Letters Patent is hereby corrected as shown below:

Column 9, Claim 6, line 45, replace "studs" with --slots--.

Column 9, Claim 6, line 46, delete "anchor" (first occurrence).

Signed and Sealed this

Fifth Day of June, 2001

*Attest:*

*Attesting Officer*

NICHOLAS P. GODICI

*Acting Director of the United States Patent and Trademark Office*